J. N. PARKER.
AGRICULTURAL SHOVEL.
APPLICATION FILED MAY 25, 1909.
929,479.
Patented July 27, 1909.
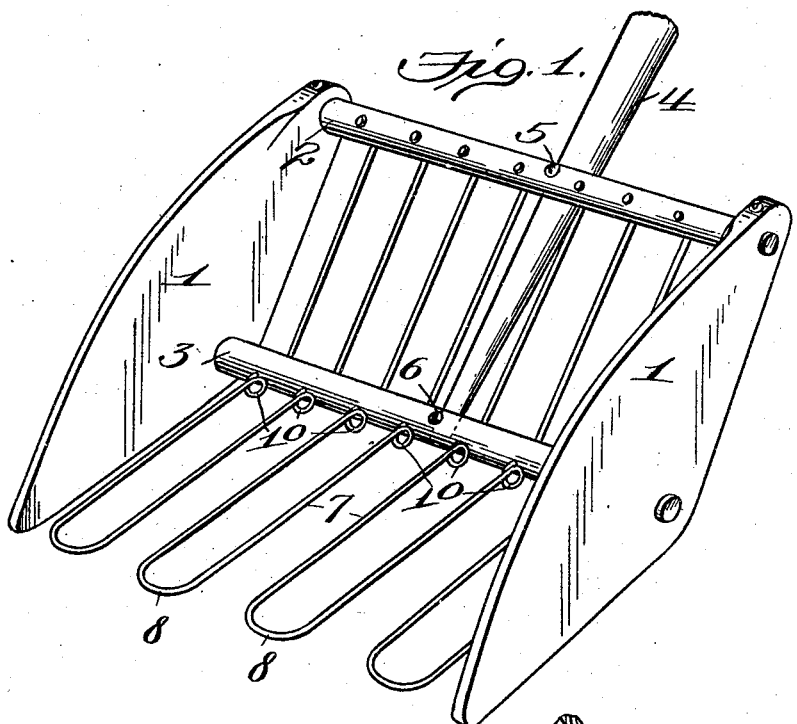
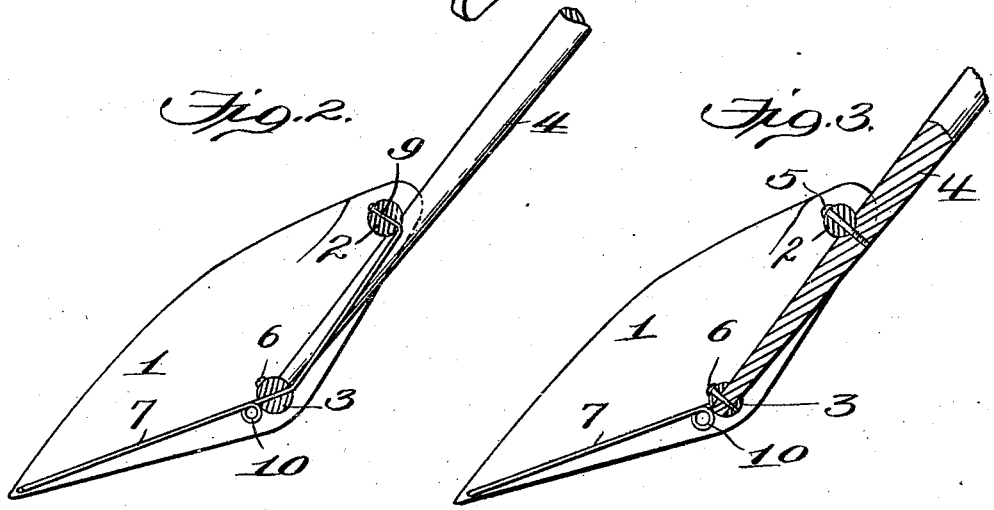
Witnesses
Inventor
Joseph N. Parker
By James L. Norris
Atty.

UNITED STATES PATENT OFFICE.

JOSEPH N. PARKER, OF KINGFIELD, MAINE, ASSIGNOR OF ONE-HALF TO LESTER L. MITCHELL, OF KINGFIELD, MAINE.

AGRICULTURAL SHOVEL.

No. 929,479.          Specification of Letters Patent.          Patented July 27, 1909.

Application filed May 25, 1909. Serial No. 498,153.

*To all whom it may concern:*

Be it known that I, JOSEPH N. PARKER, a citizen of the United States, residing at Kingfield, in the county of Franklin and State of Maine, have invented new and useful Improvements in Agricultural Shovels, of which the following is a specification.

This invention relates to new and useful improvements in agricultural shovels and it has more particular reference to a shovel intended for use especially in handling vegetables, as for example, in removing them from piles on the ground or floor.

The object of the invention is to provide a shovel which shall be exceedingly light, strong and inexpensive and which embodies tines so constructed and arranged as not to bruise or break the skins of the vegetables and having a certain degree of resiliency which contributes to the advantage noted and also to the ready manipulation of the device in the field. The tines of the shovel are spaced and are of such form that as a series they afford a concave bottom for the shovel. By virtue of this arrangement, the shovel may be shaken, in order to dislodge the clods of dirt from the vegetables, such dirt falling through the spaces between the tines.

Shovels or scoops constructed of tines are well known, from a broad standpoint, but, in so far as I am aware, the shovels of this type now known, are utterly inapplicable to the handling of vegetables in the manner described, on account of their weight and on account of their lack of flexibility. To successfully handle vegetables in the manner described, more is required than the provision of a mere scoop or body for gathering the vegetables. It is a prerequisite to practicability that the device be constructed so as not to bruise or break the skin of the vegetables, for this causes them to spoil very rapidly. This fatal objection is overcome by the improved construction herein described.

In the accompanying drawings I have illustrated a preferred and advantageous embodiment of the invention.

In the said drawings: Figure 1 is a perspective view of one form of a shovel constructed in accordance with the present invention. Figs. 2 and 3 are longitudinal sectional views through different planes of such a shovel, and Fig. 4 is a central transverse sectional view of the shovel.

Similar characters of reference denote corresponding parts throughout the several views.

The frame of the shovel comprises two substantially lozenge shaped side pieces, as 1, which are connected by cross rounds 2 and 3, the ends of the round 2 being fitted in apertures provided at the rear apices of the pieces 1 and the ends of the round 3 being fitted in apertures provided at the lower apices of the pieces 1.

The shovel is provided with a handle 4 which may be of any suitable length and which is centrally located. The handle 4 projects under the round 2, being fastened thereto by a screw 5 and its forward end projects through an opening in the round 3 and is fastened by a screw 6.

The tines are designated by the numeral 7. Each tine is of double formation, comprising a continuous wire strand which is bent to provide parallel portions connected at their forward ends by a bow shaped portion 8 of moderate curvature. In side elevation the tines are bent into substantial V shape and their parallel portions are passed through transverse openings in the round 3. The rear end portions of the tines are preferably bent angularly, as at 9, and passed through openings in the round 2, the extremities of the portions 9 being preferably flattened to provide against displacement. The portions of the tines forwardly of the round 3 are of sufficient length to have a certain degree of material resiliency which is materially augmented by forming in said forward portions coils or loops, as 10. The coils 10 are preferably tangentially located and in order to insure strength, are closely associated with the round 3. Aside from affording a greater degree of resiliency they materially strengthen the tines. The V shaped formation of the tines, in conjunction with the lozenge shaped side pieces, provides for a comparatively deep scoop-like body and when the shovel is shaken, a screening action is produced by virtue of which clods of dirt and other extraneous matter are stripped from the vegetables. The coils 10 project downwardly from the tines and therefore, will not bruise or break the skin of the vegetables. The resilient nature of the forward portions of the tines causes them to yield when necessary and to have a certain degree of play in digging under potatoes, beets or the like. The dislodgment of the vegetables is thus very readily effected and without any destructive injury. The tines are without any sharp angles which would have a weakening effect, and when the device is used reasonably, will not become bent or broken.

Having fully described my invention, I claim:

1. An agricultural shovel comprising a pair of side pieces, a pair of connecting rounds therefor and U shaped tines connected to the rounds and having forwardly projecting resilient portions, each tine terminating at its forward end in a portion of bow-shaped curvature.

2. An agricultural shovel comprising a pair of side pieces, a pair of connecting rounds therefor and tines connected to the rounds and having forwardly projecting resilient portions, each formed with coils in advance of the forward round.

3. An agricultural shovel comprising a pair of side pieces, a pair of connecting rounds therefor, and U shaped tines connected to the rounds and having forwardly projecting resilient portions, each tine being of substantial V shape in side elevation and terminating at its forward end in a portion of bow shaped curvature.

4. An agricultural shovel comprising a pair of side pieces, a pair of connecting rounds therefor and tines extending through the forward round and having their ends secured to the rear round, the tines having angularly disposed, forwardly projecting portions formed with coils in advance of and closely associated with the forward round.

5. An agricultural shovel comprising a pair of side pieces, a pair of connecting rounds therefor, and tines connected to the rounds and having angularly disposed, resilient, forwardly projecting portions having rounded free ends.

In testimony whereof I have hereunto set my hand in presence of two subscribing witnesses.

JOSEPH N. PARKER.

Witnesses:
 FRANK STANLEY,
 L. H. HUNNEWELL.